(No Model.)  3 Sheets—Sheet 1.

G. VAN WINKLE.
BRICK AND TILE MACHINE.

No. 276,544. Patented Apr. 24, 1883.

WITNESSES
Garrett Van Winkle INVENTOR
By Leggett & Leggett ATTORNEYS

N. PETERS, Photo-Lithographer, Washington, D. C.

(No Model.) 3 Sheets—Sheet 2.

G. VAN WINKLE.
BRICK AND TILE MACHINE.

No. 276,544. Patented Apr. 24, 1883.

WITNESSES
INVENTOR
Garrett Van Winkle
By Leggett & Leggett
ATTORNEYS

N. PETERS, Photo-Lithographer, Washington, D. C.

(No Model.) 3 Sheets—Sheet 3.

G. VAN WINKLE.
BRICK AND TILE MACHINE.

No. 276,544. Patented Apr. 24, 1883.

WITNESSES

Garrett Van Winkle INVENTOR

By Leggett & Leggett ATTORNEYS

N. PETERS, Photo-Lithographer, Washington, D. C.

UNITED STATES PATENT OFFICE.

GARRETT VAN WINKLE, OF AVON, ILLINOIS, ASSIGNOR TO JAMES W. PENFIELD, OF WILLOUGHBY, OHIO.

BRICK AND TILE MACHINE.

SPECIFICATION forming part of Letters Patent No. 276,544, dated April 24, 1883.

Application filed December 27, 1882. (No model.)

*To all whom it may concern:*

Be it known that I, GARRETT VAN WINKLE, of Avon, in the county of Fulton and State of Illinois, have invented certain new and useful Improvements in Brick and Tile Machines; and I do hereby declare the following to be a full, clear, and exact description of the invention, such as will enable others skilled in the art to which it pertains to make and use the same.

My invention relates to improvements in brick and tile machines; and it consists in the construction hereinafter described and claimed.

Figure 1:
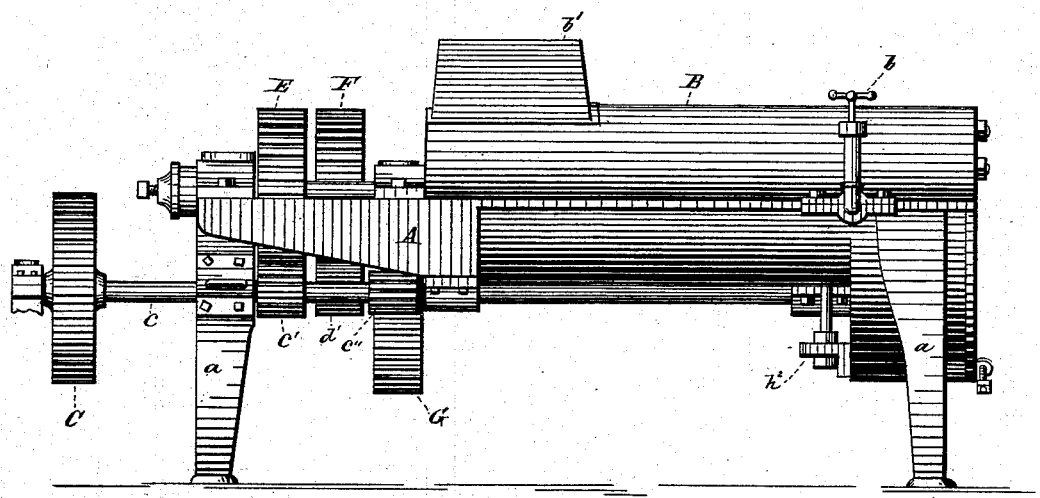

In the drawings, Figure 1 is a side elevation view of a machine embodying my invention.

The object of my invention is to improve and perfect a former device, for which Letters Patent No. 225,995 were granted, in March, 1879, to James W. Penfield, of Willoughby, Ohio, and to which reference in this specification is hereinafter made.

Figure 2:
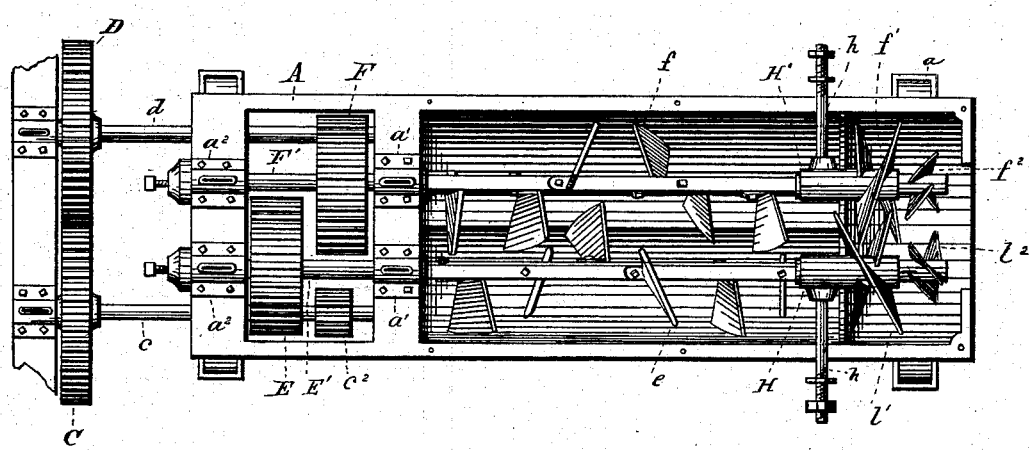
Figure 3:
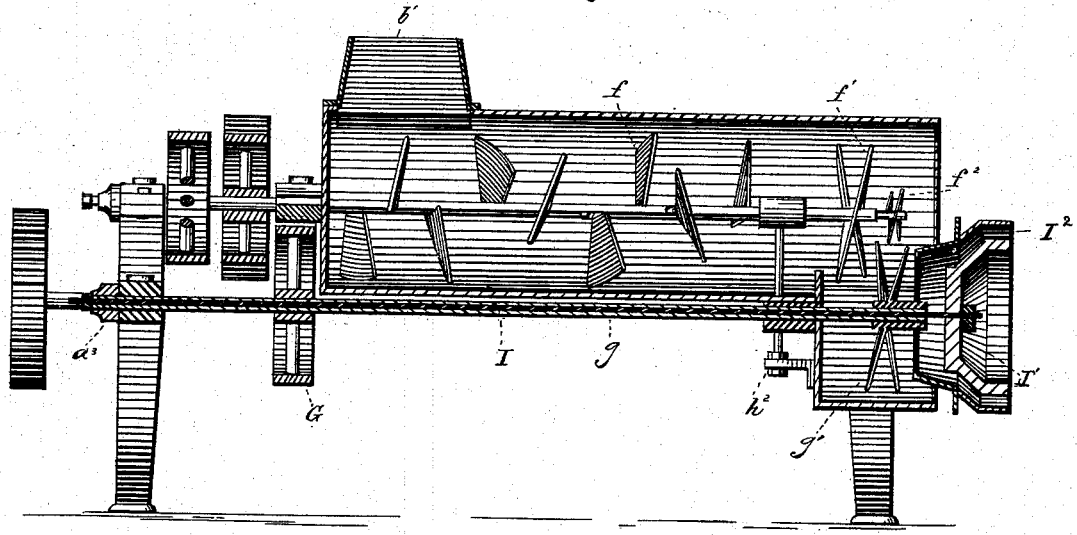
Figure 4:
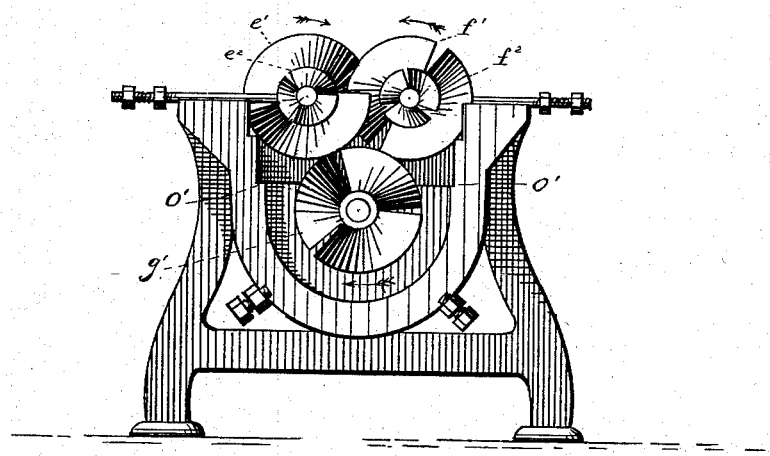
Figure 6:
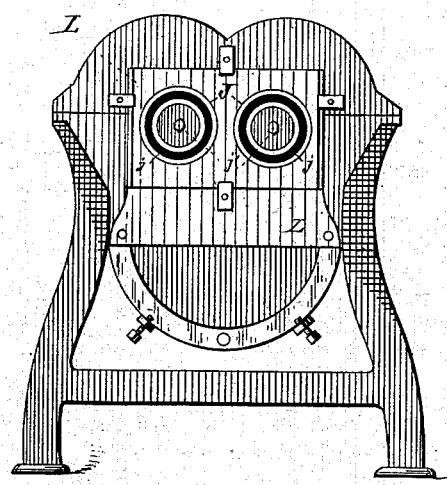
Figure 5:
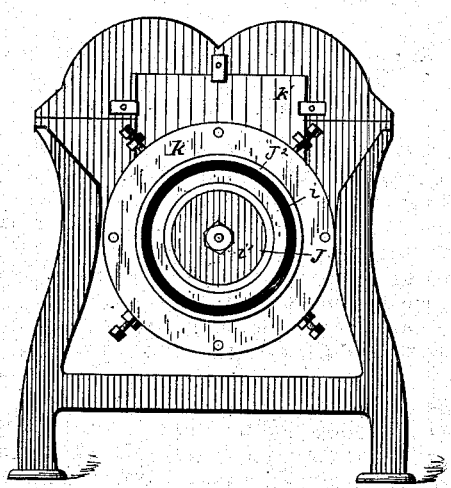

Fig. 2 is a top sectional view of the same machine. Fig. 3 is a vertical longitudinal sectional view of the machine with one form of the molding devices attached. Fig. 4 is an end view with the end casing removed. Fig. 5 is an end view of the machine as adjusted for making large tile. Fig. 6 is an end view of the machine as adjusted for making small tile. Figs. 7, 8, 9, and 10 are views in detail, more fully hereinafter described.

Fig. 1 is an external view of the machine, showing the supporting-frame A, the legs $a\ a$, and also the casing B and B'. The latter part of said casing is made detachable, and is provided with the hopper $b'$. In this figure is also shown the spur-gearing for operating the said machine. The gears C and D are co-operative, and known as "twin gears." The former is attached to the shaft $c$, the latter to the shaft $d$, Fig. 2. To the shaft $c$ are attached the pinion $c'$, engaging with the gear E, and the pinion $c^2$, engaging the gear G. To an extension of the shaft $c$ (not shown in the drawings) is attached a driving-pulley. To the shaft $d$ is also attached the pinion $d'$, engaging the gear F. The pinion $c'$ may be moved along the shaft $c$ to the position shown in Fig. 2, so as to disengage the gear G, for purpose hereinafter shown.

The continuation of the two respective shafts E and F forms the two respective pugging-shafts, to which are attached spirally and radially the inclined tempering-blades, as at $e$ and $f$. To the extreme end of these pugging-shafts are attached respectively the feed-augers $e'$, $e^2$, $f'$, and $f^2$. These feed-augers and tempering-blades on the two respective shafts are made respectively right and left handed, and the small feed-augers $e^2$ and $f^2$ are also made detachable and reversible interchangeably. The pugging-shafts are provided with the boxes $a'\ a'$ and $a^2\ a^2$, attached to the frame A, the latter being provided with set-screws and internal friction-plates for adjusting and receiving the end-thrust of the shafts, caused by the feed-augers and inclined tempering-blades. The said pugging-shafts are further supported by the boxes H and H'. To these boxes are attached the tubes $h$ and $h'$. These tubes run through supports on the frame A, and at this point are provided with adjusting or jam nuts, and by means of said tubes and said nuts the said boxes H and H' are supported and adjusted laterally. To these tubes are also attached oilers, as at $b$, Fig. 1, for lubricating the said boxes H and H'. These boxes are supported and adjusted vertically by rods attached to the bottom of the respective boxes. These rods, running through the outer casing, are secured by nuts to a support projecting from the frame A, (shown at $h^2$, Fig. 3.)

The spur-gear G drives the hollow auger-shaft $g$, to which is attached the feed-auger $g'$. Inside of said shaft is the rod I, firmly attached at one end to the box $a^3$, and holding and supporting at the other end the core I' in a central position in the mold I². The core I', the mold I², and feed-auger $g'$ are all made detachable. The direction of rotation in these augers is shown by the arrows in Fig. 4.

The machine as shown is in condition for making the large tile.

Figure 7:
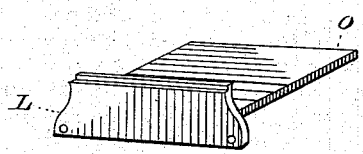
Figure 8:
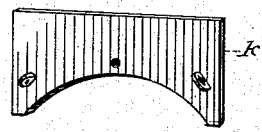
Figure 9:
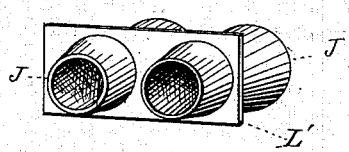
Figure 10:
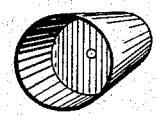

For making the smaller sizes of tile the gear G and $c'$ are disengaged, leaving the shaft $g$ at rest. The auger $g'$ is removed from the machine, as are also the core I', the mold I², and the plates K and K'. (See Fig. 5.) The plate L, Fig. 7, is placed in position, as shown in Fig. 6, closing the top of the chamber in which the auger $g'$ revolves, the horizontal portion of the plate O resting on the shoulder O' O', Fig. 4. In place of the plate K' is substituted the plate L', containing the small-sized molds $g$ and $g$, Figs. 6 and 9. The cores J' and J' of these molds (shown in Figs. 10 and 6) are secured in a central position in their respective molds by being attached by screw-bolts $j$ to the ends of the pugging-shafts. The size of these bolts and the size of the holes in the cores through which said bolts pass are relatively such that the bolts may freely revolve with the pugging-shafts while the cores remain at rest. The molds $g$ and $g$ project back from said plate L to or beyond the end of the small feeding-augers $e^2$ and $f^2$. With this adjustment the machine is in condition to make the smaller sizes of tile.

By the use of reducing-bushings or lining-plates for the molds, combined with proportionately smaller cores, the sizes of tile may be varied indefinitely.

The operation of my device is as follows: With the adjustment of the machine last shown for making small tile the clay is fed into the hopper $b'$, when, coming in contact with the tempering-blades of the respective pugging-shafts, it is thoroughly mixed or tempered and forced along and delivered to the said augers, that in turn deliver the mixed clay to molds and force it through the annular orifice between the respective molds and cores.

In making the large tile the adjustment first described, and shown in Fig. 3, is made. The small augers $e^2$ and $f^2$, however, are reversed and interchanged, so that instead of forcing the clay forward, as in case aforesaid, they press the clay backward toward the augers $e'$ and $f'$. The result of the two sets of augers pressing toward each other is to force the clay down in contact with the large auger $g'$, by which it is forced through the large mold aforesaid.

In the former machine aforesaid but one pugging-shaft was used, provided with a large feed-auger, in front of which was placed the mold for making the large tile. For making small tile the large mold was removed and a plate secured in its place. Two small augers were provided, operating in the chamber below, the said small augers receiving the clay from the large auger and forcing it through their respective molds, placed in front of them.

With the use of one pugging-shaft it was found necessary, in order to obtain sufficient mixing or tempering capacity, to make the tempering-blades much longer than is necessary when two pugging-shafts are used, and also in the former device the clay, coming in contact with the entire circumference of the casing, offered great resistance as it was forced along toward the feed-augers. In my device but a portion of an entire circumference of casing for each pugging-shaft is thus exposed, a casing between said pugging-shafts being omitted. This admits of the free commingling of the clay as it is alternately acted upon by the blades of the respective pugging-shafts, and results in the clay being quickly and thoroughly tempered and freely and easily passed along to the feed-augers aforesaid. Also, in the former device much power was expended by pressing the clay with great force against the plate in front of the large auger in the process of supplying clay to the small augers below. In my new device reversing and interchanging the small augers $e'$ and $f'$, as aforesaid, obviates this difficulty and causes the clay to be freely and easily discharged to the large auger below. It will therefore be seen that by the operation of my new device a great economy of power and wear of parts is made as compared with the operation of the former device aforesaid.

What I claim is—

1. In a tile-machine, the combination, with two pugging-shafts, each provided with tempering-blades and a feed-auger made respectively right and left handed, of two other feed-augers made respectively right and left handed and interchangeable, and also so made that they may be reversed endwise on the shafts when interchanged, substantially as set forth.

2. In a tile-machine, the combination, with two pugging-shafts, each provided with tempering-blades and a feed-auger, of two other feed-augers extending more or less into the inner ends of the thimbles of their respective molds, substantially as and for the purpose shown and described.

3. In a tile-machine, the combination, with two pugging-shafts and their respective tempering-blades, of two feed-augers for each pugging-shaft, and so arranged that the rear augers will press the clay toward their respective front augers, and that the front augers will press the clay toward their respective rear augers, resulting in relieving the front head from excessive pressure and of a free discharge of the clay to the chamber below, substantially as and for the purpose set forth.

4. In a tile-machine, the combination, with two pugging-shafts and their respective feed-augers, arranged and operated as heretofore described, of a feed-auger operating in a lower chamber receiving clay from the feed-augers above and forcing said clay through a mold in front of it, substantially as shown and described.

In testimony whereof I sign this specification, in the presence of two witnesses, this 12th day of December, 1882.

GARRETT VAN WINKLE.

Witnesses:
ALMON STEVENS,
SYLVESTER S. CLAYBERG.